United States Patent [19]

Orstad et al.

[11] 4,435,115

[45] Mar. 6, 1984

[54] DOLLY FOR LIFTING AND CARRYING DEAD SOWS AND THE LIKE

[76] Inventors: Russell D. Orstad; Durwood D. Orstad, both of Rte. 2, Villisca, Iowa 50864

[21] Appl. No.: 294,271

[22] Filed: Aug. 19, 1981

[51] Int. Cl.³ .............................................. B62B 1/06
[52] U.S. Cl. ................................ 414/490; 280/47.27; 280/47.34; 280/654; 414/494; 414/559
[58] Field of Search ............... 414/490, 494, 506, 538, 414/559; 280/652, 654, 47.24, 47.27, 47.34

[56] References Cited

U.S. PATENT DOCUMENTS

| | | | |
|---|---|---|---|
| 2,421,123 | 5/1947 | Jensen | 280/47.34 X |
| 2,440,681 | 5/1948 | Gordon | |
| 2,743,833 | 5/1956 | Peterson | |
| 2,906,420 | 9/1959 | Garcia, Jr. | |
| 3,578,353 | 5/1971 | Lockhart | |
| 3,857,579 | 12/1974 | Hoodenpyle | 280/47.34 X |
| 3,951,286 | 4/1976 | Horst | |
| 4,052,080 | 10/1977 | Hedderich et al. | 414/490 X |
| 4,211,513 | 7/1980 | Hosie | 414/559 |

Primary Examiner—Robert G. Sheridan
Attorney, Agent, or Firm—E. Robert Newman

[57] ABSTRACT

A dolly for lifting and carrying dead sows and the like from and in confined spaces, respectively. A platform on castors with a vertical back has a removable pulley, at their adjoinment, through which a cable first pulls the sow horizontally onto the platform and then vertically, after the pulley is removed, along the vertical back. The cable is pulled by a winch attached to the rear side of the vertical back.

9 Claims, 4 Drawing Figures 4,435,115

DOLLY FOR LIFTING AND CARRYING DEAD SOWS AND THE LIKE

BACKGROUND OF THE INVENTION

This invention relates to dollies with hoisting means in general, and more specifically to a dead sow lifter and carrier that uses the same means for pulling a load towards the dolly and hoisting the load onto the dolly.

Dollies with load-hoisting means are well known in the prior art, as can be seen by reference to U.S. Pat. Nos. 2,440,681; 2,743,833; 2,906,420; 3,578,353; and 3,951,286. All the references cited are characterized by the fact that the dollies do not provide for moving awkwardly placed heavy loads toward the dolly when overhead clearances limit immediately elevating the load. Some of the prior art does include means for hoisting a load onto a dolly once the load is adjacent to the dolly.

In recent years the use of controlled environment farrowing systems has increased. These systems efficiently utilize building space, leaving narrow aisles and tight corners. It is not uncommon in such systems, which are designed to be operated by one or two people, for several sows to die in their stalls for various reasons, a notable one of which is a breakdown in the ventilation system. A typical sow is five to seven feet in length and weighs four to five hundred pounds.

A sow becomes somewhat stiff shortly after death making removal from its stall and transport through the building aisles a very difficult job, even when two to four strong people undertake the task. Also, the exit from a stall is typically into an aisle perpendicular to it. Further, in order to contain a sow, the stall is frequently fully enclosed except for a gate at one end.

Typical dollies and carts can be somewhat useful in modern farrowing systems once a dead sow is moved into an aisle, but a better means for removing a dead sow from its stall and maneuvering it around corners is needed.

The instant invention was specifically developed as a solution to the above described problem. It permits one person to load a heavy sow onto a dolly and maneuver it out of the building without undue strain, delay, or frustration.

SUMMARY OF THE INVENTION

An object of the present invention is the provision of a dead sow lifter and carrier which is a dolly that can operate in a narrow aisle fronting an enclosed sow stall.

A further object of the instant invention is the provision of a dolly that can remove dead sows from stalls and then can transport dead sows easily through the narrow aisles and around the tight corners of a controlled environment farrowing system.

Another object of the instant invention is the provision of a dolly that can be wheeled in an upright or tilted position as desired.

Still another object of the instant invention is the provision of a dolly which enables one person to complete the entire task of removing a dead sow from a farrowing system building.

These and other objects and advantages and novel features of the invention will become apparent from the following detailed description of the invention when considered in conjunction with the accompanying drawings.

DESCRIPTION OF THE PREFERRED EMBODIMENT

Figure 1:
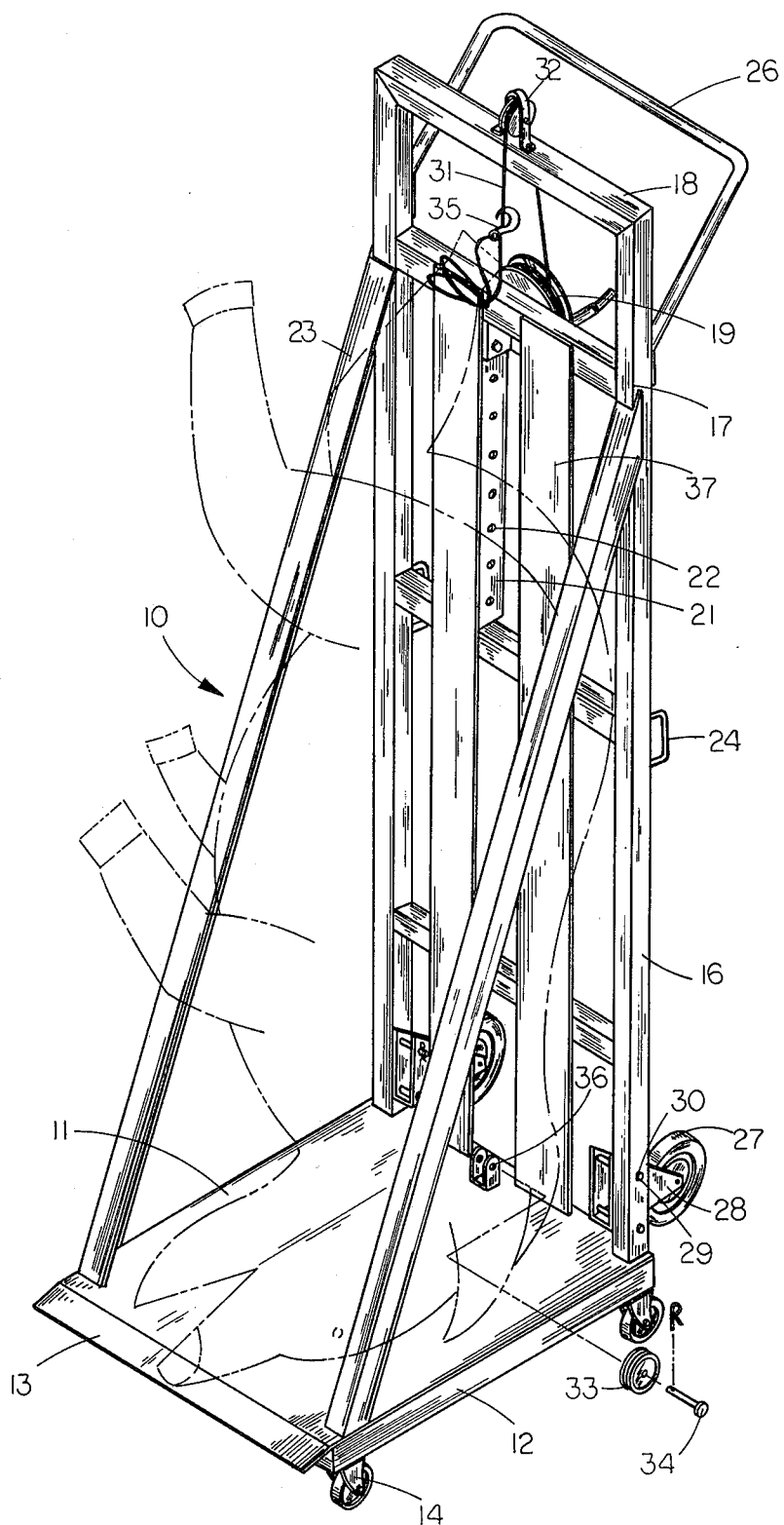
FIG. 1 is a front perpective view of the instant invention depicting a dead sow in phantom lines that has been hoisted onto the dead sow lifter and carrier.
Figure 2:
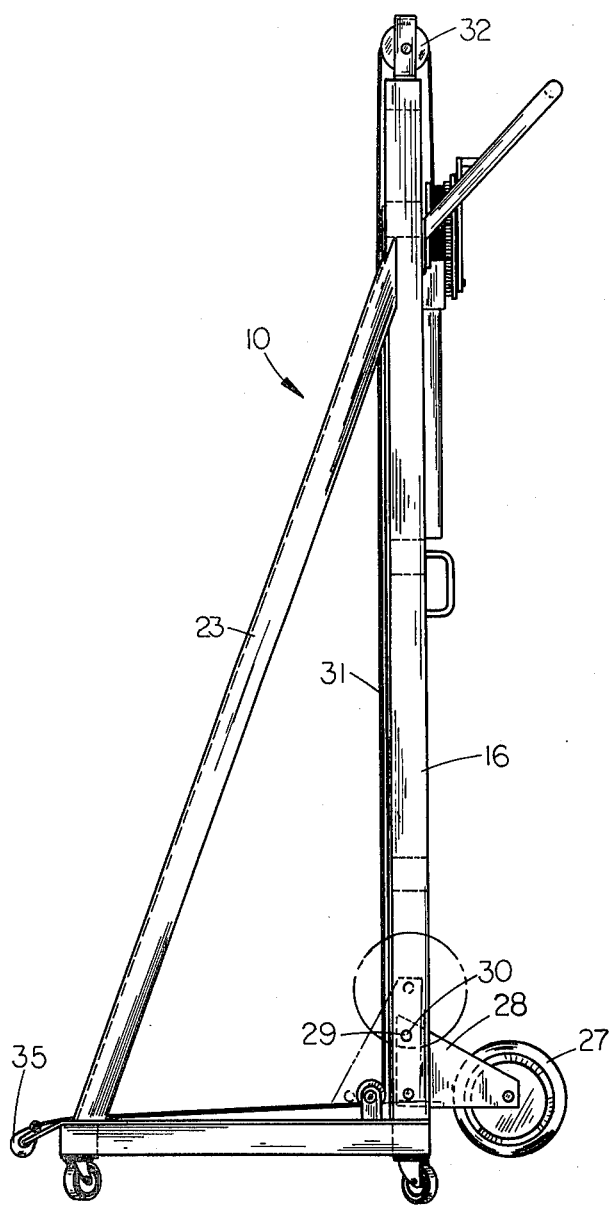
FIG. 2 is a right side view of the instant invention.
Figure 3:
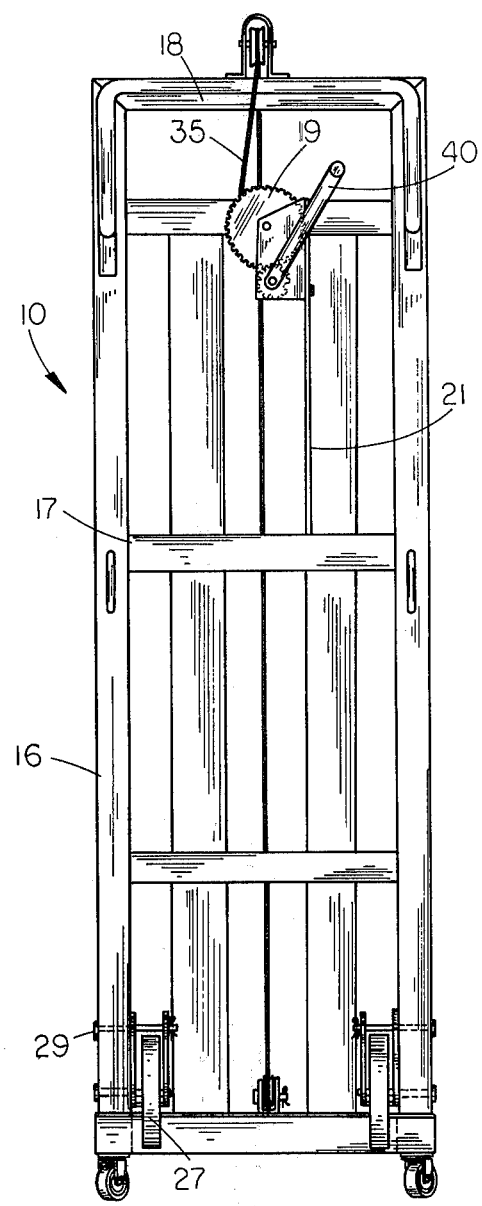
FIG. 3 is a rear view of the instant invention.

FIGS. 1, 2 and 3 illustrate a preferred embodiment of the dead sow lifter and carrier, shown generally at 10, which is a dolly specially designed for transporting dead sows in modern enclosed farrowing systems. The dolly 10 has a base which is an appropriately sized substantially square platform 11 preferably of heavy-duty sheet steel with a reinforcement 12 of square section steel members welded beneath it along its perimeter and a lip 13 formed by bending downwards a short length of the forward edge extending past the square reinforcement 12. The lip 13 at the forward edge serves to facilitate sliding a dead sow onto the platform. Attached to the bottom of the reinforcement member 12 at the corners of the platform 11 are conventional swiveling casters 14 for rolling the dolly 10 over concrete floors.

Welded to each of the rearward corners of the platform 11 are vertical members 16 (see FIG. 3) which are made of hollow square cross-section tubing that form the long sides of a rectangular back 17. Four horizontal members 18 of square section tubing connect the two vertical members 16, the uppermost length capping the vertical members 16. A length of angle iron 21 with a number of bolt holes 22 (see FIG. 1) for adjustably attaching a winch 19 is vertically attached between and to the middle two horizontal members 18. Two straight steel angle members 23 support the back 17 by being connected at one end to a forward corner of the platform 11 and at the other end to the vertical square member 16 on the same side a short distance from its upper end (see FIG. 2).

Attached to each vertical square member 16 is a small U-shaped handle 24 on the rearward face about midway between the top and bottom of each member 16. Also, a large U-shaped handle 26 is attached to the back 17, one end attached to the rearward face of each vertical member 6 a short distance from the top of each member 16, the handle forming an acute angle with the vertical members 16 with the base of the "U" up at about the same height as the uppermost horizontal member 18.

As may be more clearly seen in FIG. 2, in order that the dolly may be tilted back and rolled on two wheels, as with many conventional dollies, two wheels 27 are positioned behind the dolly 10 in two clevises 28 so that they are spaced above the ground when the dolly 10 is in an upright position. Each clevis 28 is pivotally attached to the inboard side of a vertical member 16 such that wheels 27 are positioned in vertical planes perpendicular to the back 17. Each of the two legs of each clevis 28 further has an opposing aperture 28 near a corner away from the pivotal attachment for receiving removable pins 29. Each vertical member 16 has cooperating apertures 30 for receiving pins 29 and thus holding a clevis 28 in its operating position above the ground and behind the back 17. When upper pin 29 holding the clevis to the vertical square member 16 is removed, the clevis 28 can be pivoted raising the wheel 27 up over the platform 11 out of the way for maneuvering the dolly 10 in tight quarters.

A winch 19 is attached at a convenient height for turning its crank 40 while standing behind dolly 10 to the rear side of back 17. A steel cable 31 with a hook 35 at one end is attached to the drum of winch 19 at its other end. The cable 31 runs from the winch 19 to the forward side of the back 17 over a pulley 32 that is held in place by a suitable clevis and pin at the top and center of the uppermost horizontal channel 18. Cable 31 is then directed behind a lower pulley 33 which is held in place by a removable pin 34 in a suitable clevis 36 attached to the platform 11 near its adjoinment with back 17.

Two wide flat steel strips 37 are spaced at approximately one-third points between vertical members 16 and attached to the forward sides of the three lower horizontal members 18, one end of each at the top of the platform 11 and the other end at the top of the next-to-highest horizontal channel 18. These strips facilitate hoisting the dead sow onto the dolly 10 by allowing the sow to slide against and along them.

Figure 4:
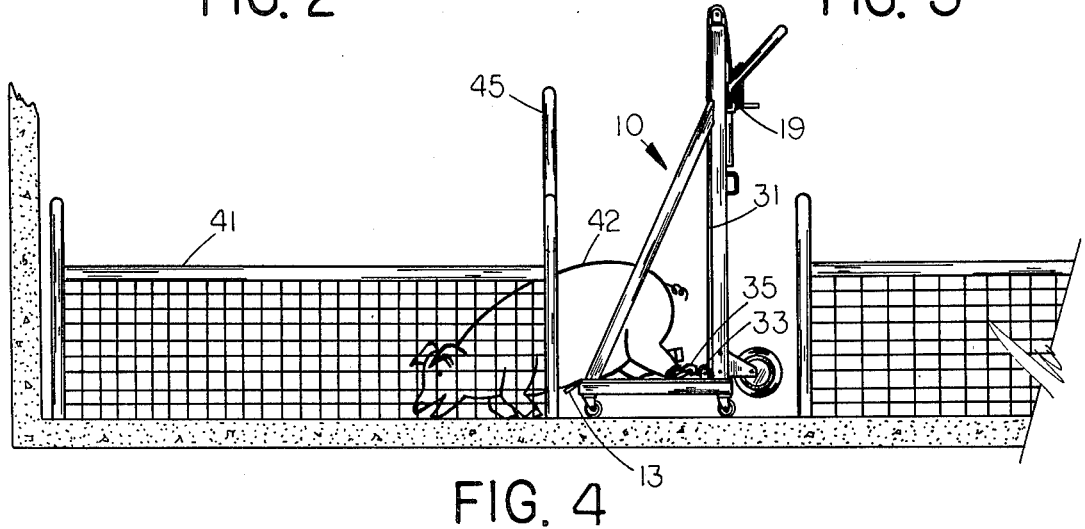
FIG. 4 is a reduced side view of the instant invention in use in a farrowing system.

The dolly 10 is utilized by first being rolled along a perimeter aisle of a farrowing building up to a stall 41 where a dead sow 42 is located and the dolly is then turned to a position facing the open stall 41 as shown in FIG. 4. The cable 31 is given slack and placed behind the lower pulley 33, then wrapped around a rear leg or portion of the dead sow 42 and secured by placing the hook 35 back onto the cable 31. The lip 13 of the platform 11 is braced against the frame of the stall 41 or against a curb and the winch 19 is turned to take up any slack in the cable 31.

The sow 42 is pulled onto the platform 11 as far as possible using the winch 19 to pull in the cable 31. As can be seen in FIG. 4, the left stall therein has its guillotine gate 45 in raised position. Removable pin 34 and pulley 33 prevent the sow 42 from being lifted upwards into open gate 45. When the sow 42 has been pulled as far as possible onto platform 11, the cable is slackened and disengaged from the lower pulley 33 by removing pin 34 and pulley 33. The end of the sow 42 on the platform 11 is then pulled up towards the top of the back 17 while sliding along strips 37, the back of sow 42 now able to turn under guillotine gate 45, until the sow 42 is completely over the platform 11. The dolly 10 can then be rolled on its casters 14 over the concrete floor through the aisles and out of the building for disposal. When uneven ground is encountered, the two wheels 27 can be lowered into position and secured for use since their larger diameter will allow the dolly 10 to roll more easily.

The dolly 10 can be altered in many ways within the basic concept of this invention. For instance, the winch 19 could be located at the very top of the vertical member 17 eliminating the need for pulley 32. The dolly 10 could be built with only two casters 14 at the forward part of the platform 11 and two fixed wheels at the rear. Additionally, the platform 11 and vertical member 17 could be manufactured out of other materials, such as cast aluminum resulting in a lighter if more expensive dolly 10.

Obvious numerous modifications and variations of the present invention are possible in light of the above teachings. It is therefore to be understood that within the scope of the appended claims, the invention may be practised otherwise than as specifically described therein.

We claim:

1. A dolly for lifting and carrying dead sows and the like in a confined space, comprising:
   a substantially square platform supported by ground engaging wheels;
   a rectangular vertical back attached at one of its narrow edges to an edge of the platform;
   a means affixed to the vertical back for pulling a cable towards the upper end of the vertical back;
   a cable attached at one end to a means for temporary attachment to a leg of a dead sow and at its second end to the cable pulling means; and
   an operably removable means affixed to the dolly near the adjoinment of the platform and the vertical back for temporarily directing the path of the cable in a horizontal direction along the platform towards the adjoinment of the platform and the vertical back and then in a vertical direction along the vertical back, whereby a dead sow can be pulled onto the platform substantially to the point of adjoinment and then lifted upwards along the vertical back.

2. A dolly for lifting and carrying dead sows and the like as recited in claim 1, wherein the cable pulling means is a winch.

3. A dolly for lifting and carrying dead sows and the like as recited in claim 2 wherein the winch is affixed at a convenient operating height on the side of the vertical back away from the platform and further comprising:
   means affixed to the upper end of the vertical back for guiding the cable from the drum of the winch over the top of the vertical member.

4. The dolly as recited in claim 2, wherein the temporarily directing means includes:
   a pin; and
   a clevis having opposing apertures for removably bearing the pin.

5. A dolly as recited in claim 2 wherein the ground engaging wheels are a plurality of casters, whereby the dolly can be maneuvered among 6. A dolly as recited in claim 2 further comprising:
   two spaced apart fixed wheels attached to the vertical member near its adjoinment to the platform, spaced above the ground and each in a vertical plane perpendicular to the vertical back whereby the dolly can be tilted back for two-wheeling.

7. A dolly as recited in claim 6 further comprising means for pivoting the two wheels attached to the vertical member out of operating positions into storage positions in order that they will not hamper the maneuvering of the dolly in close quarters.

8. A dolly as recited in claim 2 wherein the ground engaging wheels are:
   two spaced apart fixed wheels attached near the adjoinment of the platforms and the vertical member and each in a vertical plane perpendicular to the vertical member whereby the dolly may be tilted back for two-wheeling.

9. A dolly as recited in claim 8 wherein the ground engaging wheels further comprise at least one caster affixed to the bottom of the platform forward of the two fixed wheels.

* * * * *